(12) United States Patent
Azakami et al.

(10) Patent No.: US 7,846,520 B2
(45) Date of Patent: Dec. 7, 2010

(54) COUNTERFEITING PREVENTION LABEL AND METHOD OF MANUFACTURING THE SAME

(75) Inventors: Minoru Azakami, Shinjuku-Ku (JP); Hirotada Ookawa, Shinjuku-Ku (JP); Kenji Ueda, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 823 days.

(21) Appl. No.: 10/527,796

(22) PCT Filed: Jul. 14, 2004

(86) PCT No.: PCT/JP2004/010025
§ 371 (c)(1),
(2), (4) Date: Mar. 15, 2005

(87) PCT Pub. No.: WO2005/006166
PCT Pub. Date: Jan. 20, 2005

(65) Prior Publication Data
US 2006/0005918 A1   Jan. 12, 2006

(30) Foreign Application Priority Data
Jul. 14, 2003   (JP) .............................. 2003-196213

(51) Int. Cl.
*B32B 9/00* (2006.01)
*B32B 7/14* (2006.01)
*G03H 1/00* (2006.01)
*G02B 5/32* (2006.01)

(52) U.S. Cl. ..................... 428/40.1; 428/42.1; 428/201; 428/914; 428/916; 359/1; 359/2; 359/15

(58) Field of Classification Search ................ 428/40.1, 428/42.1, 43, 41.6, 914–916, 201; 359/1, 359/2, 15; 283/81, 86
See application file for complete search history.

(56) References Cited

U.S. PATENT DOCUMENTS 5,310,222 A *  5/1994  Chatwin et al. ................ 283/86
6,818,270 B2 * 11/2004  Ishimoto et al. ............ 428/40.1

FOREIGN PATENT DOCUMENTS

| DE | 4314579 A1 * | 8/1994 |
| JP | 10-049052 | 2/1998 |
| JP | 10-086566 | 4/1998 |
| JP | 10-100571 | 4/1998 |
| JP | 11-305666 | 11/1999 |

(Continued)

*Primary Examiner*—Patricia L Nordmeyer
(74) *Attorney, Agent, or Firm*—Oliff & Berridge, PLC

(57) ABSTRACT

A counterfeiting prevention label 1 has a label base 3 including a base sheet 31, and a volume hologram 2 including a volume hologram layer 22 and formed on the base sheet 31. The volume hologram 2 is extended between the upper side 31a and the lower side 31b of the label base 3. The opposite end surfaces of the volume hologram 2 are flush with the end surfaces of the label base 3, respectively. The volume hologram 2 may be placed in a depression 3a formed in the front surface of the label base 3. The volume hologram 2 and the label base 3 are blanked out after transferring the volume hologram 2 from a transfer sheet 10 to the label base 3.

10 Claims, 4 Drawing Sheets

FOREIGN PATENT DOCUMENTS

| | | |
|---|---|---|
| JP | 2000-172156 | 6/2000 |
| JP | 2000-172157 | 6/2000 |
| JP | 2000-194265 | 7/2000 |
| JP | 2000-284673 | 10/2000 |
| JP | 2002-072835 | 3/2002 |

* cited by examiner

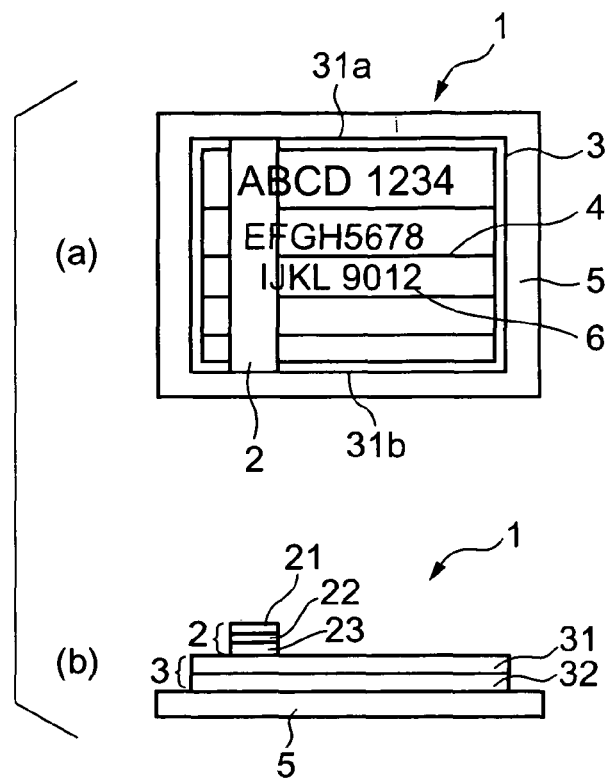
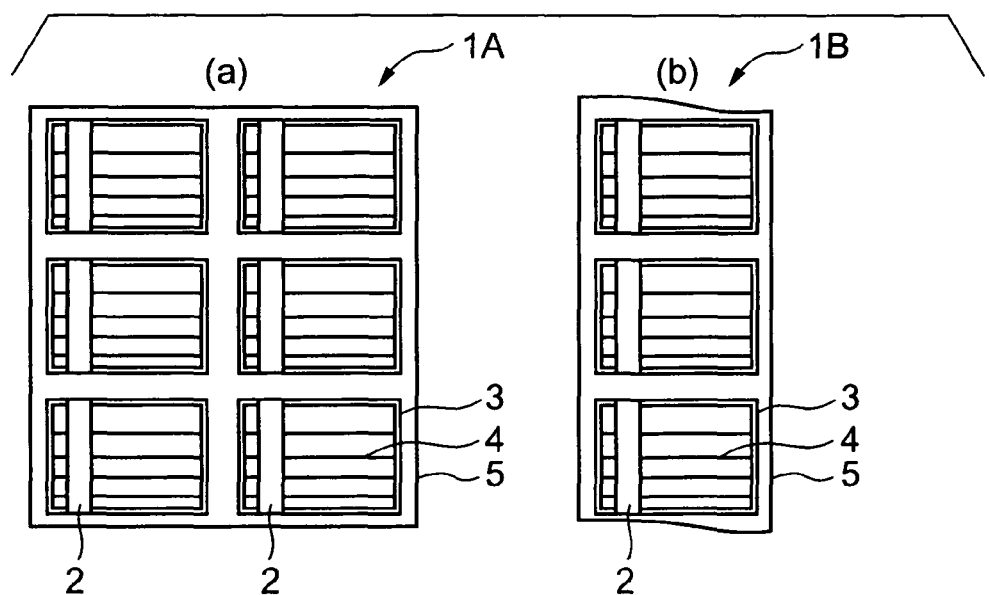
FIG. 1
FIG. 2

COUNTERFEITING PREVENTION LABEL AND METHOD OF MANUFACTURING THE SAME

TECHNICAL FIELD

The present invention relates to a counterfeiting prevention label printed with prescribed information and capable of being identified as genuine, and a method of manufacturing the counterfeiting prevention label.

BACKGROUND ART

Various measures have been invented and taken to prevent illicit activities including the sale of counterfeit articles and the illicit use of forged or counterfeit certificates and notes. The attachment of seals to articles has been a conventional method of authenticating genuine articles. Seals with a relief hologram formed by recording interference fringes in fine irregularities are used as means for authentication because relief holograms can be easily mass-produced.

A label proposed in, for example, Patent Document 1 is formed by sequentially forming a diffraction grating pattern layer, an embossed diffraction grating pattern (relief hologram), an evaporated metal layer and an adhesive layer in that order on a lower surface of a transparent plastic base.

Patent Document 1: JP 11-305666 (p. 3, FIG. 1)

The label including a relief hologram mentioned in Patent Document 1 is resistant to forgery and counterfeiting, though not quite satisfactorily. However, since the relief hologram forming method is generally known, authenticating means more secure against forgery and counterfeiting have been desired. Since the evaporated metal layer is formed over the entire lower surface in the label mentioned in Patent Document 1, the label assumes a metallic color, which makes it difficult to easily see an information recording part.

Use of a volume hologram highly resistant to forgery and counterfeiting instead of a relief hologram may be effective. However, when a label provided with a volume hologram is attached to an article, and characters are printed on the label, it is possible that the characters cannot be printed in a satisfactory print quality because a step is formed at the boundary of a region in which the volume hologram is formed and a region around the hologram region. If a volume hologram is formed on a base by decalcomania using a transfer sheet, the adverse effect of the step is reduced. However, the volume hologram must have a capability of being clearly cut out in a desired shape (hereinafter referred to as "severability") when the volume hologram is transferred from the transfer sheet to the base (hereinafter, referred to as "spot-transfer").

Since the volume hologram is a means for verifying genuineness, it is necessary to confirm the spot-transfer of the volume hologram by some method.

DISCLOSURE OF THE INVENTION

Accordingly, it is an object of the present invention to provide a highly secure counterfeiting prevention label provided with a volume hologram more resistant against forgery and counterfeiting than the conventional relief hologram, and to provide a method of manufacturing a counterfeiting prevention label provided with a volume hologram, formed in a predetermined shape.

The present invention forms a volume hologram on a transfer sheet, cuts the four sides of the volume hologram, more preferably, forms depressions, and transfers the hologram from the transfer sheet to a base. "Severability" need not be taken into consideration, no special means for confirming the successful transfer of the volume hologram is needed, and the thickness of the label does not increase.

A counterfeiting prevention label according to the present invention includes: a base sheet, and a volume hologram layer covering a part of a front surface of the base sheet; wherein the volume hologram layer has the shape of a ribbon and extends between a first end of the base sheet and a second end of the base sheet opposite the first end, the end surface of one end of the volume hologram layer is flush with the end surface of the first end of the base sheet, and the end surface of the other end of the volume hologram layer is flush with the end surface of the second end of the base sheet.

In the counterfeiting prevention label of the present invention, the base sheet has a quadrilateral shape, and the volume hologram layer extends between a first side of the base sheet and a second side of the same opposite the first side.

In the counterfeiting prevention label of the present invention, the volume hologram layer is bonded to the front surface of the base sheet with a heat-sensitive adhesive layer or a pressure-sensitive adhesive layer.

In the counterfeiting prevention label of the present invention, a surface of the volume hologram layer not facing the base sheet is coated with a protective layer.

In the counterfeiting prevention label of the present invention, a part, coated with the volume hologram layer, of the surface of the base sheet is depressed relative to a part, not coated with the volume hologram, of the surface of the base sheet to form a depression.

In the counterfeiting prevention label of the present invention, a self-adhesive layer is formed on a back surface of the base sheet, and the self-adhesive layer is covered with a release sheet.

In the counterfeiting prevention label of the present invention, the release sheet is larger than the base sheet, the base sheet, the volume hologram layer and the self-adhesive layer form a laminated structure, a plurality of laminated structures are arranged on the release sheet, and the laminated structures have substantially the same desired shape in a plane and are spaced apart from each other.

In the counterfeiting prevention label of the present invention, characters are printed on the volume hologram layer and/or a part, not coated with the volume hologram layer, of the surface of the base sheet.

Characters may be printed across the boundary between the volume hologram layer and the surface, not coated with the volume hologram layer, of the base sheet to provide the label with the effect of a tally impression.

A counterfeiting prevention label manufacturing method according to the present invention includes the steps of: forming a transfer ribbon by releasably laminating a volume hologram layer to a support sheet; transferring the volume hologram layer to a front surface of a base sheet by superposing the transfer ribbon on the base sheet with the volume hologram layer facing the base sheet; and blanking out the base sheet and the volume hologram layer in a predetermined shape.

In the counterfeiting prevention label manufacturing method according to the present invention, a depression is formed in the surface of the base sheet before transferring the volume hologram layer to the surface of the base sheet, and the volume hologram layer is transferred to the bottom surface of the depression.

In the counterfeiting prevention label manufacturing method according to the present invention, characters are printed on the volume hologram layer and/or a part, not coated with the volume hologram layer, of the surface of the base sheet before blanking out the base sheet and the volume hologram layer in a desired shape.

BRIEF DESCRIPTION OF THE DRAWINGS

FIG. 1 is a view of a counterfeiting prevention label according to the present invention.

FIG. 2 is a view of assistance in explaining the arrangement of the counterfeiting prevention labels according to the present invention.

BEST MODE FOR CARRYING OUT THE INVENTION

Figure 3:
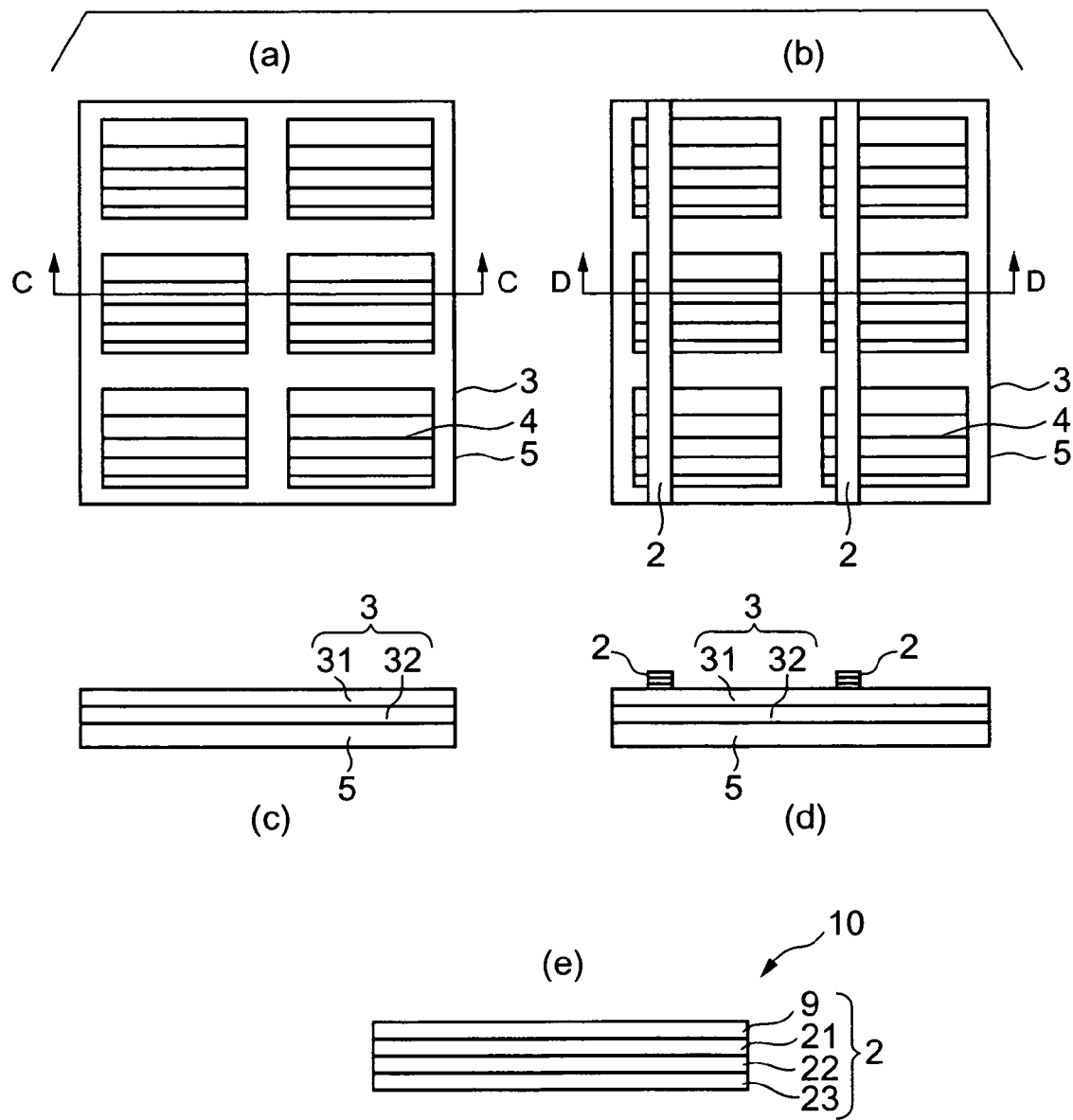
FIG. 3 is a view of assistance in explaining the step of laminating a volume hologram layer to a base sheet included in a counterfeiting prevention label manufacturing method according to the present invention.
Figure 4:
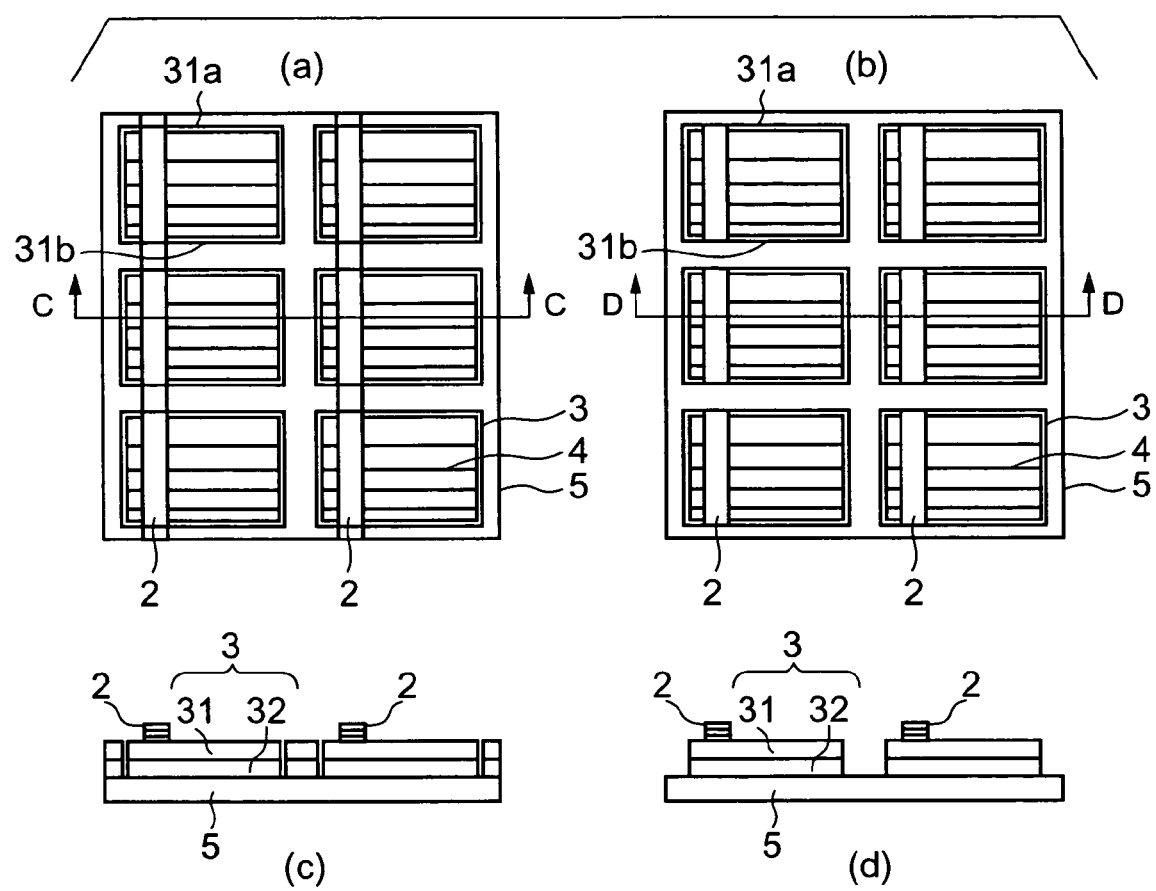
FIG. 4 is a view of assistance in explaining the step of removing a punched-out part in the counterfeiting prevention label manufacturing method according to the present invention.
Figure 5:
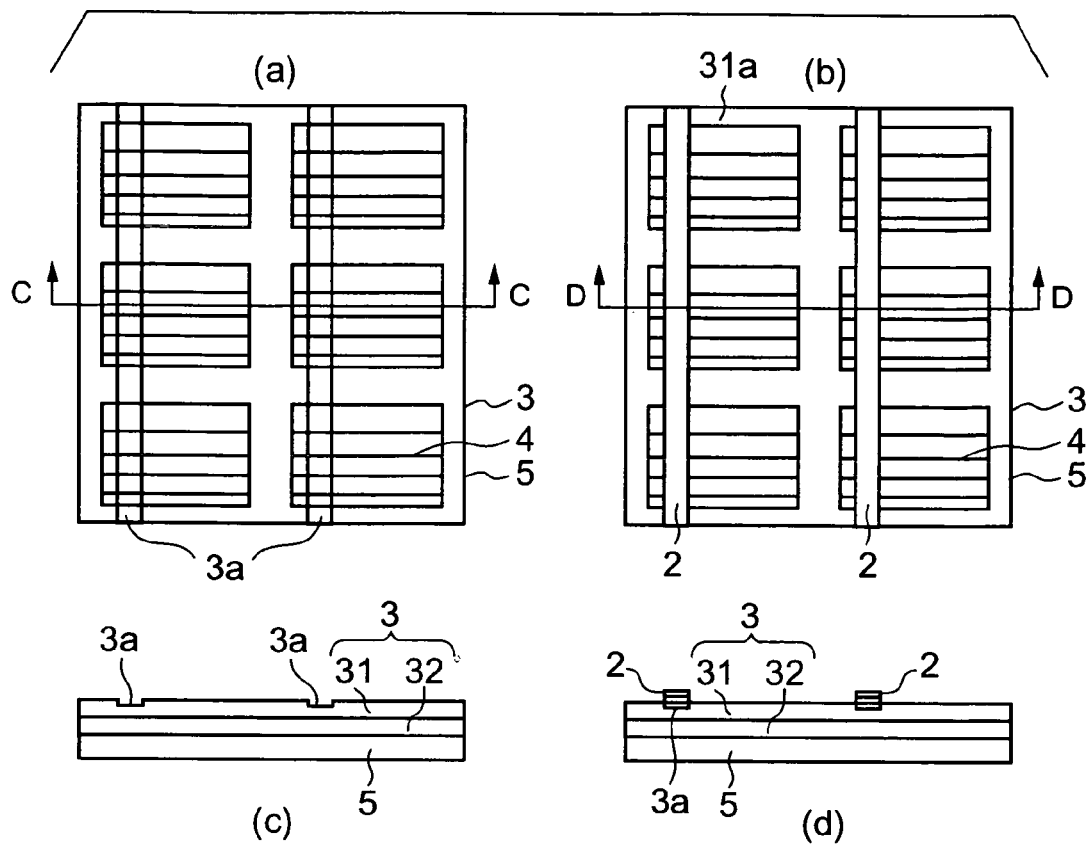
FIG. 5 is a view of assistance in explaining the step of forming a depression in a part of the base sheet and transferring a volume hologram layer to the depression.
Figure 6:
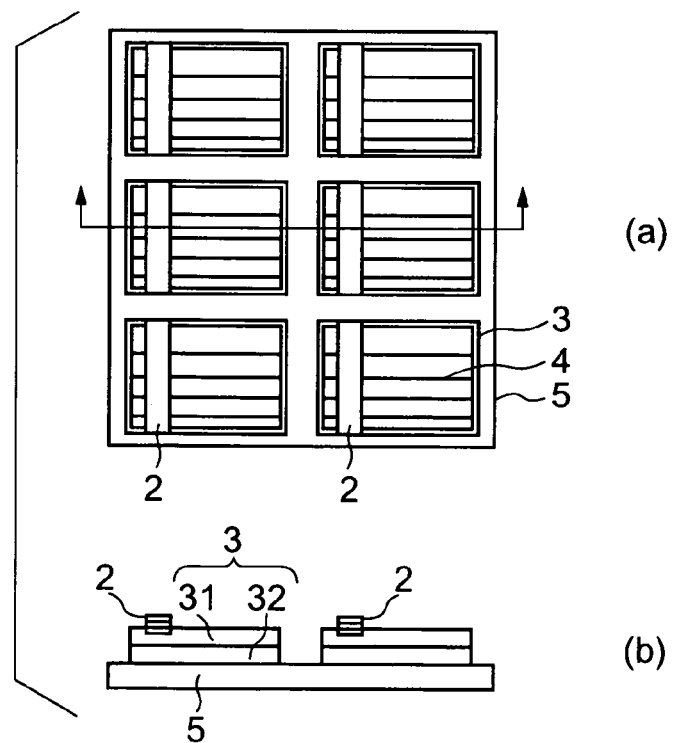
FIG. 6 is a view of a state where volume hologram layers have been transferred to depressions formed in a base sheet by the counterfeiting prevention label manufacturing method according to the present invention.

FIG. 1 shows a counterfeiting prevention label according to the present invention. FIG. 2 shows counterfeiting prevention labels according to the present invention before printing. FIGS. 3 and 4 are views of assistance in explaining the steps of a counterfeiting prevention label manufacturing method according to the present invention. FIGS. 5 and 6 are views of assistance in explaining the step of another counterfeiting prevention label manufacturing method according to the present invention.

Referring to FIGS. 1(a) and 1(b), a counterfeiting prevention label 1 according to the present invention has a base sheet 31, a volume hologram layer 22 bonded to the front surface of the base sheet 31 with a heat-sensitive adhesive layer (or a pressure-sensitive adhesive layer) 23, and a release protective layer 21 covering the volume hologram layer 22. A self-adhesive layer 32 is formed on the back surface of the base sheet 31 and is covered with a release sheet 5. FIGS. 1(a) and 1(b) are a plan view and a side elevation, respectively, of the counterfeiting prevention label. The base sheet 31 and the adhesive layer 32 form a label base 3. The release protective layer 21, the volume hologram layer 22 and the heat-sensitive adhesive layer 23 form a volume hologram structure (or volume hologram) 2.

When necessary, frames 4 and item designations are formed on the surface of the base sheet 31 of the label base 3. In FIG. 1(a), the ribbon-shaped volume hologram structure 2 is extended between the upper and the lower side of the laterally elongate, rectangular label base 3.

Characters 6 are printed in the frames 4 extending across the boundary between the volume hologram structure 2 and the surface, not coated with the volume hologram structure 2, of the base 3.

The ribbon-shaped volume hologram structure 2 including the volume hologram layer 22 is extended between the upper side (first end) 31a and the lower side (second end) 31b of the label base 3 including the base sheet 31.

The end surface of the label base 3 on the upper side 31a of the label base 3 including the base sheet 31 and the end surface of the volume hologram structure 2 including the volume hologram layer 22 are contained in a vertical plane. The end surface of the label base 3 on the lower side 31b of the label base 3 and the end surface of volume hologram structure 2 are contained in a vertical plane.

The end surfaces of the label base 3 and the corresponding end surfaces of the volume hologram structure 2 on the upper side 31a and the lower side 31b of the label base 3 can be contained in the same vertical planes, respectively, by attaching the label base 3 including the base sheet 31 to the release sheet 5, placing the ribbon-shaped volume hologram structure 2 including the volume hologram layer 22 on the label base 3 and cutting the volume hologram structure 2 and the label base 3 from above without cutting the release sheet 5, i.e., by half blanking.

A plurality of laminated structures 2, 3 each consisting of the volume hologram structure 2 and the label sheet 3 may be formed on the release sheet 5 by cutting the volume hologram structure 2 and the label base 3 without cutting the release sheet 5, which will be described later.

The shape of the label base 3 mentioned in connection with FIG. 1 is a comparatively common shape. The shape in a plane of the label base 3 is optional, the shapes of the frames 4 and the item designations are optional, and the size and the position on the label base 3 of the volume hologram structure 2 are optional. The shape of the label base 3 is not limited to the quadrilateral shape; the label base 3 may be formed in optional shape such as a polygonal shape, a circular shape, an elliptic shape or a star shape. The label base 3 may be provided with bat cuts or perforations. The item designations are selectively determined taking into consideration the uses of the counterfeiting prevention label 1. The frames 4 specify printing areas or improve the visibility of the characters 6. The frames 4 may be omitted. Since materials of the volume hologram structure 2 are expensive, it is economically preferable to form the volume hologram structure 2 in a shape having a small area, such as a shape resembling a ribbon. The volume hologram structure 2 may be greater than that shown in FIGS. 1(a) and 1(b). Since the characters 6 are easily visible when the same are formed in an area not coated with the volume hologram structure 2, therefore, the volume hologram structure 2 is formed in a small area and the volume hologram structure 2 is disposed in part of an area in which the characters 6 are printed.

The position of the volume hologram structure 2 can be optionally determined such that a person is able to view the volume hologram structure 2 easily. The position of the volume hologram can be determined so that the volume hologram structure 2 may not obstruct reading the characters 6. The position of the volume hologram structure 2 can be determined such that the volume hologram structure 2 can be recognized by a viewer from a specific position in a certain positional relation with a light source and cannot be recognized by the viewer from a position other than the specific position. Since the volume hologram structure 2 must be viewed from a specific viewing direction, the volume hologram structure 2 can be disposed such that the volume hologram structure 2 can be easily visible from the direction of the characters 6 on the label base 3.

It is desirable that a low step is formed at the boundary between the volume hologram structure 2 and a part in which the volume hologram structure 2 is not placed in a region where the characters are printed. Strokes of the printed characters 6 are broken at the step even if the characters 6 are impressed on the surface. Practically desirable height of the step is 20 μm or below, preferably, 15 μm or below. It is desirable to form the volume hologram structure 2 to be attached to the label base 3 is formed in the smallest possible thickness to form the step in such a low height. Practically, it is desirable that all the components of the laminated structure, namely, the volume hologram layer 22, the heat-sensitive adhesive layer 23 and the release protective layer 21, are thin. It is preferable to reduce the apparent height of the volume hologram structure 2, namely, the height of a part of the volume hologram structure 2 projecting from the surface of the label base 3, by forming a depression 3a (FIGS. 5(a) and 5(b)) in a part, to which the volume hologram structure 2 is attached, of the label base 3 instead of by forming the volume hologram structure 2 in a small thickness. The height of the step will be further effectively reduced by forming the volume hologram structure 2 in a small thickness and forming the depression 31 in a part to which the volume hologram structure 2 is attached.

It is preferable to arrange the label bases 3 of a plurality of label units of counterfeiting prevention labels similar to the counterfeiting prevention label 1 of a label unit shown n FIG. 1 on a common release sheet 5 at lateral and longitudinal intervals as shown in FIGS. 2(a) and 2(b). In a counterfeiting prevention label sheet 1A shown in FIG. 2(a), label bases 3 each provided with frames 4 and a volume hologram structure 2 similar to those shown in FIG. 1 are arranged in six label units, or in three rows and two columns at intervals. Counterfeiting prevention label sheets similar to the counterfeiting prevention label sheet 1A are suitable for printing matters thereon by a printer as an output unit of a computer and for writing matters thereon by handwriting. The number of the label units is not limited to six and any suitable number of label units may be arranged on a release sheet.

Referring to FIG. 2(a), the release sheet 5 is larger than the label bases 3. The label base 3 and the volume hologram structure 2 constitute a laminated structure 2, 3. A plurality of laminated structures 2, 3 of substantially the same desired shape, such as a quadrilateral shape, are arranged in a spaced arrangement on the release sheet 5.

In a counterfeiting prevention label sheet 1B shown in FIG. 2(b), label bases 3 each provided with frames 4 and a volume hologram layer 2 similar to those shown in FIG. 1 are arranged longitudinally at equal intervals on a long release sheet. A long release sheet 5 supporting a plurality of label bases 3 thereon in a longitudinal arrangement is wound in a roll. The label bases 3 are printed successively with necessary matters. The counterfeiting prevention label sheet 1B provided with the label bases 3 printed with the necessary matters is mounted on a labeling machine provided with a labeling mechanism for attaching labels to articles.

Preferably, the counterfeiting prevention label 1 of the present invention is formed by a transfer system using a transfer sheet in view of forming the volume hologram structure 2 in a small thickness and forming a low step. Thus the use of the volume hologram structure 2 supported on a plastic film or the like can be avoided. Materials forming the component layers of the counterfeiting prevention label 1 and methods of forming the component layers will be described.

The base sheet 31 of the label base 3 may be any one of various paper sheets, plastic films, foamed plastic films, metal foils, nonwoven fabrics, woven fabrics and laminated sheets each of some of the foregoing materials. In view of ability to absorb the ink used for printing the characters 6 and ability to conceal, it is preferable to form the base sheet 31 from a paper sheet. Although a white plastic film is desirable in view of ability to conceal, the base sheet 31 may be a transparent, colored, glossy or matte sheet, depending on the use of the counterfeiting prevention label. Preferably, the thickness of the base sheet 31 is in the range of about 50 μm to about 1 mm. The thickness of the base sheet 31 may be outside this thickness range.

The front surface, to which the volume hologram structure 2 is attached, of the base sheet 31 may be blank. When necessary, it is preferable that names of items representing the printed characters 6 and frames 4 are formed on the surface of the base sheet 31. A proper pattern and a trademark may be formed on each label base 3 preferably by printing. The frames 4 do not necessarily need to be a closed pattern. Continuous lines or dotted lines indicating printing regions may be used instead of a closed pattern.

The self-adhesive layer 32 bonds the counterfeiting prevention label 1 to an article. Although the material forming the self-adhesive layer 32 is not limited to a self-adhesive, it is preferable to form the self-adhesive layer 32 of a self-adhesive because a self-adhesive exhibits a sufficient adhesive strength when pressure is applied thereto and is adhesive to a comparatively many kinds of materials without preference. The self-adhesive may be a generally known one, such as an acrylic resin, an acrylic ester resin, a copolymer of those resins, a styrene-butadiene copolymer, natural rubber, casein, gelatin, rosin ester, a terpene resin, a phenolic resin, a styrene resin, a coumarone-indene resin or a polyvinyl ether silicone resin. The self-adhesive may be an α-cyanoacrylate resin adhesive, a silicone resin adhesive, an maleimide resin adhesive, a styrol resin adhesive, a polyolefin resin adhesive, a resorcinol resin adhesive or a polyvinyl ether resin adhesive. Preferably, the thickness of the self-adhesive layer is in the range of abut 4 to about 20 μm.

The self-adhesive layer 32 may be formed by directly spreading a self-adhesive on the base sheet 31. However, it is preferable to form the self-adhesive layer 32 on the releasing surface of the release sheet 5 and to affix the release sheet 5 to the base sheet 31 with the self-adhesive layer 32 in contact with the base sheet 31.

The release sheet 5 is selected taking into consideration the properties of a self-adhesive forming the self-adhesive layer 32. The release sheet 5 may be a releasing polyolefin resin film, such as a polyethylene resin film or a polypropylene resin film, a paper sheet or a plastic film coated with a polyolefin resin film, a paper sheet or a plastic film coated with a releasing resin, such as a silicone resin, a fluorocarbon resin or a resin containing a releasing material, such as wax.

The self-adhesive layer 32 and the base sheet 31 preferably provided with names of items or frames 4 are laminated in that order to the release sheet 5, and the volume hologram layer 22 is attached to the surface of the base sheet 31. Although the volume hologram layer 22 may be directly formed on the base sheet 31, it is preferable to form the volume hologram layer 22 by decalcomania using a volume hologram transfer sheet 10 shown in FIG. 3(e).

As shown in FIG. 3(e), the volume hologram transfer sheet 10, in principle, is a laminated structure formed by attaching the volume hologram structure 2 consisting of the releasing protective layer 21, the volume hologram layer 22 and the heat-sensitive adhesive layer 23 to a support sheet 9.

The support sheet 9 is a base sheet for supporting the component layers of the volume hologram structure 2 to form a volume hologram transfer sheet. The volume hologram structure is released from the support sheet 9 and is transferred to the label base 3. The support sheet 9 must be resistant to solvents contained in composite materials for forming the component layers of the volume hologram structure 2, must have strength sufficient to withstand breaking force that may be exerted thereon during handling, and must be resistant to heat and pressure, particularly, to heat of high temperatures.

More concretely, the support sheet 9 may be a plastic film, a metal foil or a paper sheet. However, in view of surface smoothness and tensile strength, suitable films as the support sheet 9 are, for example, those of polyethylene terephthalate (PET) resins, polyvinyl chloride (PVC) resins, polyvinylidene chloride resins, polyethylene resins, polypropylene resins, polycarbonate resins, cellophane, acetate, nylon resins, polyvinyl alcohol resins, polyamide resins, polyamidimde resins, ethylene-vinyl alcohol copolymers, polymethyl methacrylate (PMMA) resins, poly(ether sulfone) resins and poly(ether ether ketone) (PEEK) resins. The thickness of the support sheet is in the range of about 5 to 200 µm, preferably, in the range of 10 to 50 µm. A layer for adjusting the adhesion of the component layer of the volume hologram structure to the support sheet 9 and to adjust the separability of the volume hologram structure may be formed on the support sheet 9.

The release protective layer 21 of the volume hologram structure 2 ensures the separation of the volume hologram structure 2 from the support sheet 9 and protects physically and chemically the layers including the volume hologram layer 22 and underlying the release protective layer 21 after transfer.

A material for forming the release protective layer 21 is selectively determined taking into consideration adhesion to separation from the support sheet 9. Possible materials for forming the release protective layer 21 are vinyl chloride-vinyl acetate copolymers and acrylic resins including poly (methyl methacrylate) resins when the support sheet is a film of a polyethylene terephthalate resin. Preferably, the release protective layer 21 is formed of any one of those resins or a mixture of some of those resins. Those resins may contain a releasing substance, such as wax, to ensure separation.

Possible materials for forming the release protective layer 21 other than the foregoing materials are binders for general paints and inks, such as polyester methacrylate resins, partially hydrolyzed polyester methacrylate resins, polyvinyl acetate resins, hydrolyzed polyvinyl acetate resins, polyvinyl alcohol resins, partially acetal polyvinyl alcohol resins, tri-acetyl cellulose, polyisoprene resins, polybutadiene resins, polychloroprene resins, silicone rubber, polystyrene resins, polyvinyl butyral resins, polychloroprene resins, polyvinyl chloride resins, chlorinated polyethylene resins, chlorinated polypropylene resins, poly-N-vinylcarbazol resins, derivatives of poly-N-vinylcarbazol resins, poly-N-vinyl-pyrrolidone resins, derivatives of poly-N-vinylpyrrolidone resins, styrene-maleic anhydride copolymers, half-esters of styrene-maleic anhydride copolymers, copolymers containing at least one of copolymerizable monomers including acrylic acid, acrylate, methacrylic acid, methacrylate, acrylamide, acrylonitrile, ethylene, propylene, vinyl chloride and vinyl acetate and mixtures of those substances. Preferable materials for forming the release protective layer 21 are polyisoprene resins, polybutadiene resins, polychloroprene resins, polyvinyl alcohol resins, polyvinyl acetal resins, namely, partially acetal polyvinyl alcohol resins, polyvinyl butyral resins, polyvinyl acetate resins, ethylene-vinyl acetate copolymers, vinyl chloride-vinyl acetate copolymers, polyester methacrylate resins and mixtures of some of those materials.

The release protective layer 21 is formed by applying a release protective layer forming composition in a film to the support sheet by a suitable coating method, and curing the film by drying, heating, UV irradiation and/or electron beam irradiation depending on the components of the release protective layer forming composition. The release protective layer forming composition is prepared by mixing one or some of the foregoing materials, a releasing substance, such as wax or silicone and a reinforcing resin or an additive for reinforcing the release protective layer 21 or other additives in a solvent or a diluent. The thickness of the release protective layer 21 is between 0.1 and 10 µm when the release protective layer 21 is intended to be included in an ordinary transfer sheet. It is preferable that the thickness of the release protective layer 21 is not greater than 5 µm when the release protective layer 21 is intended to be included in the counterfeiting prevention label of the present invention.

The volume hologram layer 22 is formed by recording interference fringes of interference light waves produced by interference between an object light wave and a reference light wave on a film of a volume hologram recording material of a thickness greater than intervals between the interference fringes. The volume hologram recording material may be a known one, such as a silver haloid emulsion, a bichromated gelatin emulsion, a photopolymerizble polymer or a photo-cross-linkable polymer. In view of efficiently forming the volume hologram layer 22, volume hologram recording materials of types (1) and (2) are desirable.

Type (1): A mixture of a binder resin, a photopolymerizable composition, photopolymerization initiator and a sensitizing dye Suitable materials as the binder resin of Type (1) include poly(meth)acrylate resins, partially hydrolyzed poly(meth) acrylate resins, polyvinyl acetate resins, hydrolyzed polyvinyl acetate resins, copolymers containing at least one of copolymerizable monomers including acrylic acid and acrylate and mixtures of some of those materials. Polyisoprene-type resins, polybutadiene-type resins, polychloroprene-type resins, polyvinyl alcohol resins, polyvinyl acetal resins, namely, partially acetal polyvinyl alcohol resins, polyvinyl butyral resins, polyvinyl acetate resins, vinyl chloride; vinyl acetate copolymers and mixtures of some of those materials are also possible materials as the binder resin. A heating process heats and moves monomers to stabilize a recorded hologram. Therefore it is desirable that the binder resin has a comparatively low glass transition point to facilitate the movement of monomers.

Possible photopolymerizable compositions are photopolymerizable or photo-crosslinkable materials having at least one unsaturated ethylene bond, such as photopolymerizable or photo-crosslinkable monomers, oligomers, prepolymers and mixtures of some of those materials. For example, an unsaturated carboxylic acid, an unsaturated carboxylate, an ester of an unsaturated carboxylic acid and an aliphatic polyol composition or a polyamide of an unsaturated carboxylic acid and an aliphatic polyamine composition are also possible materials.

Examples of monomers of unsaturated carboxylic acids are acrylic acid, methacrylic acid, itaconic acid, crotonic acid, isocrotonic acid, and maleic acid. Examples of monomers of halogenated unsaturated carboxylic acids are 2,2,3,3-tetrafluoropropyl acrylate, 1H,1H,2H,2H-heptadeca-fluorodecyl acrylate and 2,2,3,3-tetrafluoropropyl methacrylate.

Examples of monomers of esters each of an unsaturated carboxylic acid and an aliphatic polyol composition are acrylic esters including ethylene glycol acrylate, triethylene glycol acrylate, 1,3-butanediol diacrylate, tetramethylene glycol diacrylate, propylene glycol diacrylate, neopentyl glycol diacrylate, trimethylolpropane triacrylate, trimethylolpropane tri(acryloiloxypropyl)ether and trimethylolethane triacrylate. Examples of methacrylate esters are tetramethylene glycol dimethacrylate, triethylene glycol dimethacrylate, neopentyl glycol dimethacrylate and trimethylolpropane trimethacrylate. Examples of itaconates are ethylene glycol di-itaconate, propylene glycol di-itaconate, 1,3-butanediol di-itaconate and 1,4-butanediol di-itaconate. Examples of crotonates are ethylene glycol dicronate, tetramethylene glycol dicronate, pentaerythritol dicronate, and sorbitol tetracronate. Examples of isocrotonates are ethylene glycol di-isocrotonate, pentaerythritol di-isocrotonate, and sorbitol tetraisocrotonate. Examples of maleates are ethylene glycol dimaleate, triethylene glycol dimaleate, pentaerythritol dimaleate and sorbitol tetramaleate.

Examples of monomers of amides each of an unsaturated carboxylic acid and an aliphatic polyamine composition are methylene bisacrylamide, methylene bismethacrylamide and 1,6-hexamethylene bisacrylamide.

Possible photopolymerization initiators are 1,3-di (t-butyl dioxycarbonyl)benzophenone, 3,3',4,4'-tetrakis(t-butyl dioxycarbonyl)benzophenone, N-phenyl glycine, 2,4,6-tris (trichloromethyl) S-triazine, 3-phenyl-5-iso-oxazolone, 2-mercaptobenzimidazole and imidazole dimers. In view of stabilizing a recorded hologram, it is desirable to decompose the photopolymerization initiator after recording the hologram. For example, organic peroxides are preferable because organic peroxides can be easily decomposed by UV irradiation.

Possible sensitizing dyes are those capable of absorbing radiation of wavelengths between 350 and 600 nm including thiopyrylium salt dyes, merocyanine dyes, quinoline dyes, styrylquinoline dyes, ketocoumarin dyes, thioxanthene dyes, xanthene dyes, oxocol dyes, cyanine dyes, rhodamine dyes, thiopyrylium salt dyes, pyrylium ion dyes and diphenyl iodonium inon dyes. A sensitizing dye capable of absorbing radiation of wavelengths of 350 nm or below or a sensitizing dye capable of absorbing radiation of wavelengths of 600 nm or above may be used.

A desirable photopolymerizable composition concentration of a volume hologram recording material of Type (1) is 10 to 1000 parts, preferably, 10 to 100 parts, for a binder resin concentration of 100 parts. A desired photopolymerization initiator concentration is 1 to 10 parts, preferably, 5 to 10 parts, for a binder resin concentration of 100 parts. A desirable sensitizing dye concentration is 0.01 to 1 part, preferably, 0.01 to 0.5 parts, for a binder resin concentration of 100 parts. The unit of concentration in "parts" is "parts by mass" unless otherwise specified. Other components of the volume hologram recording material are, for example, a plasticizer, glycerin, diethylene glycol, triethylene glycol, and various nonionic surface-active agents, cationic surface-active agents or anionic surface-active agent.

The binder resin, the photopolymerizable composition, the photopolymerization initiator, the sensitizing dye and, when necessary, other components are dissolved or dispersed in one of ketone solvents including methyl ethyl ketone, acetone and cyclohexanone, ester solvents including ethyl acetate, butyl acetate and ethylene glycol diacetate, aromatic solvents including toluene and xylene, Cellosolve solvents including methyl Cellosolve, ethyl Cellosolve and butyl Cellosolve, alcohols including methanol, ethanol and propanol, ether solvents including tetrahydrofuran and dioxane, and halogen solvents including dichloromethane and chloroform. Thus a coating composition having a solid concentration of 10 to 70% by mass is prepared.

When sheets are to be coated with the thus prepared coating composition in a single-sheet processing mode, the coating composition is applied to the sheets by a bar coating method, a spin coating method or a dipping method. When a long web unwound from a roll is to be coated with the coating composition, the coating composition is applied to the long web by a gravure coating method, a roll coating method, a die coating method or a comma coating method. A film of the coating composition thus formed is dried or cured depending on the property of the coating composition. A volume hologram recording film thus formed is in the range of 0.1 to 50 µm, preferably, in the range of 3 to 30 µm, when the volume hologram recording film is intended for forming an ordinary transfer sheet. When the volume hologram recording film is intended for forming the counterfeiting prevention label of the present invention, it is desirable that the thickness of the volume hologram recording film is not greater than 15 µm, preferably, not greater than 10 µm, to form a thin transfer layer. When necessary, the volume hologram recording film formed on a film is coated with a protective film. The protective film is a transparent resin film of a thickness in the range of about 10 to about 100 µm having a smooth surface, such as a polypropylene resin film or a polyvinyl chloride resin film. The protective film is attached to the volume hologram recording film with a rubber roller or the like. The material for forming the volume hologram recording film may be a marketed material, such as Omnidex 801 commercially available from du Pont.

A volume hologram is recorded on the volume hologram recording material of Type (1) in a two-beam interference mode using two laser beams. Possible laser beams are Ar laser beams of 514.5 nm (6.0 W), 488 nm (4.8 W) and 457.9 nm (0.9 W) in wavelength, Kr beams of 647.1 nm (1.75 W), 568.2 nm (0.6 W), 520.8 nm (0.4 W), and 413.1 nm 0.9 W) in wavelength, Kr laser beams of 350.7 nm (1.0 W) in wavelength, Ar laser beams of 351.1 nm (1.0 W) and 368.8 nm (1.0 W) in wavelength, Ne laser beams of 332.4 nm (50 mW) in wavelength and Cd laser beams of 325.0 nm (15 mW).

One of those wavelengths, capable of exciting the photopolymerization initiator is used to record interference fringes or to record the pattern of interference between an object beam and a reference beam. When the volume hologram recording material is coated with a protective film, the protective film is removed, a negative volume hologram plate is placed directly in close contact with the volume hologram recording material, a laser beam is projected from the side of the support sheet supporting the volume hologram recording material and the pattern of interference between the laser beam reflected from the negative volume hologram plate and the laser beam fallen directly on the volume hologram recording material is recorded to provide information about the volume hologram.

Then, the volume hologram recording material is subjected to a photopolymerization initiator decomposing process using a UV light source capable of emitting UV radiation for an irradiance in the range of 0.1 to 10,000 mJ/cm$^2$, preferably, 10 to 1,000 mJ/cm$^2$, such as an extra-high-pressure mercury lamp, a high-pressure mercury lamp, a carbon arc lamp, a xenon arc lamp or a metal halide lamp, and a photopolymerizable composition diffusing process that heats the volume hologram recording material, for example, at 120° C. for 120 min to form a stable volume hologram layer 22 in which a volume hologram is formed.

A volume hologram recording material of Type (2) contains a cation-polymerizing material, which is in a liquid phase at a room temperature, a radical-polymerizing composition, a composite photo radical polymerization initiator sensitive to light of a specific wavelength and capable of promoting the polymerization of a radical-polymerizing composition, and a composite photo cationic polymerization initiator sensitive to light of another wavelength and capable of promoting the polymerization of a radical-polymerizing composition. The composite radical polymerization initiator contains a radical polymerization initiator and a sensitizer. The composite photo cationic polymerization initiator contains a cationic polymerization initiator, such as an acid generating agent. Each of those materials may contain one kind of an agent or some of agents having the same effect. The radical polymerization initiator and the photo cationic polymerization initiator may be different substances or may be the same substance, provided that the substance is capable of generating both radicals and an acid.

The volume hologram recording material of Type (2) is applied in a volume hologram recording film to a base film, the volume hologram recording film is irradiated with a laser beam to which the composite photo radical polymerization initiator is sensitive or the like (first exposure process) and then the volume hologram recording film is irradiated with a light beam of a wavelength different from that of the laser beam to which the composite photo cationic polymerization initiator is sensitive (second exposure process) to record a volume hologram on the volume hologram recording film. The radical-polymerizing composition is polymerized by the first exposure process, and the cation-polymerizing composition is polymerized by Brönsted acid or Lewis acid generated by decomposing the composite photo cationic polymerization initiator by irradiating the entire surface of the volume hologram recording film by the second exposure process.

The cation-polymerizing composition that is in a liquid phase at a room temperature is used so that the polymerization of the radical-polymerizing composition is carried out in a composite having a comparatively low viscosity. Possible cation-polymerizing compositions are diglycerol diether, pentaerythritol polyglycidyl ether, 1,4-bis(2,3-epoxypropoxy-fluoroisopropyl)cyclohexane, sorbitol polyglycidyl ether, 1,6-hexane diol glycidyl ether, polyethylene glycol diglycidyl ether and phenyl glycidyl ether.

Preferably, the radical-polymerizing composition contains at least one ethylic unsaturated double bond in each molecule. Preferably, the radical-polymerizing composition has an average refractive index, such as 0.02, greater than that of the cation-polymerizing composition. If the refractive index of the racial-polymerizing composition is excessively small, satisfactory refractive index modulation cannot be achieved. Possible radical-polymerizing compositions are, fore example, acrylamide, methacrylamide, styrene, 2-bromostyrene, phenyl acrylate, 2-phenoxyethyl acrylate, 2,3-naphthalene dicarboxylic acid(acryloxyethyl)monoester, methyl phenoxyethyl acrylate, nonyl phenoxyethyl acrylate and β-acryloxyethyl hydrogen phthalate.

The photo radical polymerization initiator generates active radicals in the first exposure process. The active radicals promote the polymerization of the radical-polymerizing composition. The generally light-absorbing sensitizing agent may be used in combination with an active radical generating composition or an acid generating composition. A colored composition, such as a dye, is often used as the sensitizing agent of the composite radical polymerization initiator to absorb visible laser light. It is preferable to use a cyanine dye to form a transparent, colorless hologram. Since the cyanine dye is easily decomposed when the same is exposed to light, the dye contained in the hologram is decomposed when the hologram is subjected to the second exposure process or is exposed to illuminating light or sunshine for several hours or several days. Consequently, the hologram becomes a transparent, colorless hologram not absorb visible radiation.

Possible cyanine dyes are, for example, anhydro-3,3'-dicarboxymethyl-9ethyl-2,2'-thiacarbocyanine betain, anhydrio-3-carboxymethyl-3',9'-diethyl-2,2'-thiacarboxycyanine betain, 3,3',9-triethyl-2,2'-thiacarobocyanine iodine salt, 3,9-diethyl-3'-carboxymethyl-2,2'-thiacarbocyanine iodine salt, 3,3'9-triethyl-2,2'-(4.5,4'5'-dibenzo)thiacarbocyanine iodine salt, 2-[3-(3-ethyl-2-benzothiasolidine)-1-propenyl]-6-[2-(3-ethyl-2-benzothiazolidine)ethylidene imino]-3-ethyl-1,3,5-thiazolium iodine salt, 2-[[3-aryl-r-oxo-5-(3-n-propyl-5,6-dimethyl-2-benzothiazolidine)-ethylidene-2-thiazolinidine] methyl]-3-ethyl-4,5-diphenyl thiazolinium iodine salt, 1,1'3,3,3'3'-hexa-methyl-2,2'-indotricarbocyanine iodine salt, 3,3'-diethyl-2,2'-thiatricartocyanine perchlorate, anhydro-1-ethyl-4-methoxy-3'-carboxymethyl-5'-chloro-2,2'-quinothiacyanine betain and anhydro-5,5'-diphenyl-9ethyl-3,3'-disulphopropyl oxacarbocyanine hydroxide-triethylamine salt. Some of those cyanine dyes may be used in combination.

Active radical generating compositions that can be used in combination with a cyanine dye are dialyl iodonium salts and 2,4,6-substituted-1,3,5-triazines. Diallyl iodonium salts are preferable when high sensitivity is desired. Possible dually iodonium salts are chlorides, such as diphenyl iodinum, 4,4'-dichlorophenyl iodoinium, 4,4'-dimethoxy diphenyl iodonium, 4,4'-ditertiarybutyl diphenyl iodonium and 3,3'-dinitrodiphenyl iodonium, bromides, tetrafluoroborates, hexafluorophosphate, hexafluoroarsenate, hexafluoroantimonate, trifluoromethane sulfonate and 9,10-dimethoxy-anthracene-2-sulfonate. Examples of 2,4,6-substituted-1,3,5-triazines are 2-methyl-4,6-bis(trichloromethyl)-1,3,5-triazone, 2,4,6-tris(trichloromethyl)-1,3,5-triazone, 2-phenyl-4,6-bis(trichloromethyl)1,3,5-triazine, 2,4-bis(trichloromethyl)-6-(p-methoxyphenylvinyl)1,3,5-triazone and 2-(4'-methoxy-1'-naphthyl)-4,6-bis)trichloromethyl)-1,3,5-triazine.

The composite photo cationic polymerization initiator has low sensitivity to the light used by the first exposure process. A desirable composite photo cationic polymerization initiator generates Brönsted acid or Lewis acid when irradiated with light of a wavelength different from that of the light used by the first exposure process to promote the polymerization of the cation-polymerizing composition. A composite photo cationic polymerization initiator that does not promote the polymerization of the cation-polymerizing composition during the first exposure process is particularly preferable. Possible composite photo cationic polymerization initiators are, for example, diallyl iodine salts, triallyl sulfonium salts and iron-allene complexes. Preferable diallyl iodine salts are the tetrafluoloborate of diallyl iodonium, namely, a composite photo radical polymerization initiator, hexafluorophosphate, hexafluoroarsenate and hexafluoroantimonate. Preferable triallyl sulfonium salts are triphenylsulfonium and 4-tertiary butylphenyl sulfonium.

When necessary, the volume hologram recording material of Type (2) may be used in combination with a binder resin, thermal polymerization initiator, a silane coupling agent, a plasticizer or a coloring matter. A binder resin is used to improve the film forming property of the composite before hologram formation and the uniformity of film thickness and to stabilize an interference film formed by polymerization caused by irradiation with light, such as laser light before the second exposure. A binder resin satisfactorily compatible with a cation-polymerizing composition and radical-polymerizing composition. Desirable binder resins are chlorinated polyethylene resins, polymethyl methacrylate resins, copolymers each of methyl methacrylate and alkyl(meth)acrylate, copolymers each of vinyl chloride and acrylonitrile, and vinyl acetate. The binder resin may have reactive groups, such as cation-polymerizing groups, in its main chains.

Desirably, the composition of the volume hologram recording material of Type (2) is between 10 and 300 parts by mass, preferably, between 50 and 200 parts by mass cation-polymerizing composition, between 10 and 300 parts by mass, preferably, between 50 and 200 parts by mass radical-polymerizing composition, between 1 and 30 parts by mass, preferably, between 5 and 20 parts by mass composite photo radical polymerization initiator and between 1 and 30 parts by mass, preferably, between 5 and 20 parts by mass, composite photo cationic polymerization initiator. When the binder resin is to be added to the volume hologram recording material, the amount of the binder resin is 100 parts by mass.

The cation-polymerizing composition, the radical-polymerizing composition, the composite photo radical polymerization initiator, the composite photo cationic polymerization initiator and, when necessary, other components are dissolved or dispersed in a solvent to prepare a coating composition having a solid concentration in the range of 10 to 50% by mass. Possible solvents are ketone solvents including methyl ethyl ketone, acetone and cyclohexane, ester solvents including ethyl acetate, butyl acetate and ethylene glycol diacetate, aromatic solvents including toluene and xylene, Cellosolves including ethyl Cellosolve and butyl Cellosolve, alcohols including methanol, ethanol and propanol, ether solvents including tetrahydrofran and dioxane, and halogen solvents including dichloromethane and chloroform.

When the coating composition is applied to sheets in a single-sheet processing mode, the coating composition is applied to the sheets by a bar coating method, a spin coating method or a dipping method. When a long web unwound from a roll is to be coated with the coating composition, the coating composition is applied to the long web by a gravure coating method, a roll coating method, a die coating method or a comma coating method. A film of the coating composition thus formed is dried or cured depending on the property of the coating composition. A volume hologram recording film thus formed is in the range of 0.1 to 50 µm, preferably, in the range of 3 to 30 µm, when the volume hologram recording film is intended for forming an ordinary transfer sheet. When the volume hologram recording film is intended for forming the counterfeiting prevention label of the present invention, it is desirable that the thickness of the volume hologram recording film is not greater than 15 µm, preferably, not greater than 10 µm, to form a thin transfer layer.

A volume hologram is recorded on the volume hologram recording material of Type (2) in a two-beam interference mode using two laser beams having a wavelength in the range of 300 to 1200 nm for a first exposure process to recode interference fringes of a desired image by polymerizing the radical-polymerizing composition. Then, the unreacted cation-polymerizing-composition is cured by irradiating the whole volume hologram recording material with light to which the composite cationic polymerization initiator is sensitive, such as light having a wavelength in the range of 200 to 700 nm, for a second exposure process to form the volume hologram layer 22. The remaining unreacted radical-polymerizing composition may be also cured by the second exposure process. The volume hologram recording material may be treated by infrared rays or heat after the desired image has been formed and prior to the second exposure process to change diffraction efficiency and the peak wavelength and the half width of diffracted light.

The heat-sensitive adhesive layer 23 made adhesive by heat applied thereto when the volume hologram layer 22 is transferred to a sheet and bonds the volume hologram layer 22 to the sheet Heat-sensitive adhesives suitable for forming the heat-sensitive adhesive layer 23 are thermoplastic resins including ethylene-vinyl acetate copolymers (EVAs), polyamide resins, polyester resins, polyethylene resins, ethylene-isobutyl acrylate copolymers, polyvinyl butyral resins, polyvinyl acetate resins, copolymers containing a polyvinyl acetate resin, cellulose resins, polymethyl methacrylate resins, polyvinyl ether resins, polyurethane resins, polycarbonate resins, polypropylene resins, epoxy resins, phenolic resins, styrene-butadiene-styrene block copolymers (SBSs), styrene-isoprene-styrene block copolymers (SISS), styrene-ethylene-butylene-styrene block copolymers (SEBSs), styrene-ethylene-propylene-styrene copolymers (SEPSs). A thermoplastic resin capable of being heat sealed at a temperature not higher than 180° C. is desirable. An ethylene-vinyl acetate copolymer (EVA) having an acetic acid content of 25% or above is preferable. The heat-sensitive adhesive layer 23 may be colored. The thickness of the heat-sensitive adhesive layer 23 is between 1 and 10 µm, preferably, between 1 and 7 µm, when the heat-sensitive adhesive layer 23 is intended to be included in an ordinary transfer sheet. It is preferable that the thickness of the heat-sensitive adhesive layer 23 is not greater than 5 µm when the heat-sensitive adhesive layer 23 is intended to be included in the counterfeiting prevention label of the present invention to form a thin transfer layer.

The volume hologram transfer sheet 10 can be also fabricated by sequentially laminating the release protective layer 21, the volume hologram layer 22 and the heat-sensitive adhesive layer 23 in that order to the support sheet 9. However, it is possible that an eluate from the material forming the release protective layer 21 underlying the volume hologram recording layer formed by applying a volume hologram recording material to form the volume hologram layer 22 permeates the volume hologram recording layer or that a solvent contained in the heat-sensitive adhesive layer 23 overlying the volume hologram layer 22 permeates the volume hologram layer 22 and affects adversely to volume hologram formation. To prevent such an adverse effect of the sequential formation of those layers, it is preferable to form the release protective layer 21, the volume hologram layer 22 and the heat-sensitive adhesive layer 23 separately on separate sheets, respectively, to bond together the release protective layer 21 and the volume hologram layer 22 by the tackiness of the incomplete volume hologram layer 22 and to bond together the volume hologram layer 22 and the heat-sensitive adhesive layer 23 by the adhesion of the heated heat-sensitive adhesive layer 23.

Preferably, the volume hologram transfer sheet 10 thus fabricated is cut in a predetermined width to use the same for manufacturing the counterfeiting prevention label of the present invention. Usually, the volume hologram transfer sheets 10 are formed in long volume hologram transfer ribbons of a predetermined width by slitting a long volume hologram transfer web.

To transfer the volume hologram 2 from the volume hologram transfer sheet 10 to the base sheet 31 of the counterfeiting prevention label 1, the volume hologram transfer sheet 10 is superposed on the base sheet 31 of the counterfeiting prevention label 1 with the heat-sensitive adhesive layer 23 of the volume hologram transfer sheet 10 in contact with the base sheet 31, the heat-sensitive adhesive layer 23 is heated and pressed against the base sheet 31 by a pair of rollers, at least one of which is a hot roller, or by a hot press to bond the volume hologram layer 22 to the base sheet 31 by the adhesion of the heated heat-sensitive adhesive layer 23, and then the support sheet 9 is peeled off.

When the volume hologram layer 22 of the transfer sheet 10 is transferred to the base sheet 31, the heat-sensitive adhesive layer 23 is activated by heat and pressure. To form the counterfeiting prevention label sheets 1A and 1B having the plurality of label bases 3 arranged at intervals as mentioned in connection with FIGS. 2(a) and 2(b), the position of the volume hologram transfer sheet 10 is changed to transfer the volume hologram layers 22 at desired parts of the base sheet 31. Thus the volume holograms 2 can be arranged at intervals so as to conform to the arrangement of the label bases 3. The volume ho layers 22 may contain inorganic or organic particles to form clear boundaries between regions to which the volume hologram layers 22 are transferred from the volume hologram transfer sheet 10 and regions to which nothing is transferred in order that the volume hologram layers 22 transferred to the base sheet 31 have sharp outlines, respectively.

The counterfeiting prevention labels 1 of the counterfeiting prevention label sheets 1A and 1B explained in connection with FIGS. 2(a) and 2(b) are formed in an attractive appearance with the end surfaces of the volume hologram layers 22 flush with the end surfaces of the label bases 3. FIGS. 3 and 4 illustrate some steps of a counterfeiting prevention label manufacturing method capable of forming the counterfeiting prevention labels 1 in an attractive appearance. FIGS. 5 and 6 illustrate some steps of another counterfeiting prevention label manufacturing method capable of forming the counterfeiting prevention labels 1 in an attractive appearance.

Referring to FIG. 3(a), a laminated structure is fabricated by bonding the base sheet 31 to the release sheet 5 by the self-adhesive layer 32. The item names and the frames 4 may be formed on the surface of the base sheet 31. Then, as shown in FIG. 3(b), the volume holograms 2 are transferred from the volume hologram transfer sheet 10 and are attached to the surface of the base sheet 31. The volume hologram transfer sheet 10 is a long ribbon (FIG. 3(e)), and heat and pressure are applied uniformly to whole surface of the base sheet 31. The continuous volume holograms 2 are extended across the longitudinally arranged frames 4 as shown in FIG. 3(b). FIGS. 3(c) and 3(d) are sectional views taken on the line C-C in FIG. 3(A) and on the line D-D in FIG. 3(b), respectively.

After the volume holograms 2 have been transferred from the volume hologram transfer sheet 10 to the base sheet 31, cuts are formed in the volume holograms 2 and the label bases 3 so as to reach the surface of the release sheet 5 as shown in FIG. 4(a) with a cutting die provided with cutting blades arranged at intervals in a pattern conforming to the predetermined size of the labels. Since the transferred volume holograms 2 are cut together with the base sheet 31 and the self-adhesive layer 32, the end surfaces of the volume holograms 2 are flush with the opposite sides 31a and 31b of the label bases 3 including the base sheets 31, respectively.

After the volume holograms 2 and the label bases 3 have been thus cut, fragments of the base sheets 31 and the self-adhesive layers 32 remaining between the label bases 3 are removed to complete the counterfeiting prevention label sheets 1A and 1B shown in FIGS. 2(a) and 2(b) (FIG. 4(b)) in which the label bases 31 are arranged at intervals on the release sheet 5.

It is desirable to form the counterfeiting prevention label 1 of the present invention such that a low step is formed between the volume hologram 2 and the label base 3 in view of printing characters and the like on the counterfeiting prevention label 1 in high print quality. Therefore, it is desirable to form the volume hologram 2 in a small thickness and/or to place the volume hologram 2 in a depression 3a formed in the surface of the label base 3.

FIGS. 4(c) and 4(d) are sectional views taken on the line C-C in FIG. 4(a) and on the line D-D in FIG. 4(b), respectively.

Referring to FIG. 5(a), the base sheets 31 are bonded to the release sheet 5 by the self-adhesive layers 32, and depressions 3a of a width corresponding to that of the volume holograms 2 are formed in the surfaces of the base sheets 31 with an embossing die. The embossing die may be either an embossing roller or an embossing plate.

Then, as shown in FIG. 5(b), the volume holograms 2 are transferred from the volume hologram transfer sheet 10 to the base sheets 31 such that the volume holograms 2 are aligned with the depressions 3a and are attached to the bottom surfaces of the depressions 3a, respectively. A lower part of each volume hologram 2 sinks in the depression 3a and hence only a thin upper part of the volume hologram 2 protrudes from the surface of the base sheet 31. Then, the volume holograms 2 and the base sheets 3 are cut as mentioned in connection with FIG. 4(a). Fragments of the base sheets 31 and the self-adhesive layers 32 remaining between the label bases 3 are removed to complete the counterfeiting prevention labels 1. The volume holograms 2 may be pressed firmly against the base sheets 3 to form depressions in the surfaces of the base sheets 3 and to sink the volume holograms 2 partly in the depressions when the volume holograms 2 are transferred to the base sheets 31 instead of previously forming the depressions 3a in the base sheets 3 as shown in FIG. 5(a).

FIGS. 5(c) and 5(d) are sectional views taken on the line C-C in FIG. 5(a) and on the line D-D in FIG. 5(b), respectively.

The counterfeiting prevention label 1 of the present invention can be applied to various uses owing to its high capacity of being identified as genuine. The following articles are representative examples of those to which the counterfeiting prevention label 1 of the present invention can be effectively applied.

Various troubles arise if, for example, a credit card, a cash card, a note or an identification card is counterfeited or dishonestly altered and is used illegally. Therefore, it is effective to apply the counterfeiting prevention label 1 of the present invention to such an article to prevent losses due to counterfeiting and dishonest alteration and to identify the article to be genuine. It is also effective to apply the counterfeiting prevention label 1 of the present invention to expensive high-quality goods, such as watches, leather goods, articles of precious metals and jewelry, particularly, big-name brand goods, audio devices, electric appliances, software recorded in a recording medium, such as music software, video software, game software and computer software, because those goods and articles can be counterfeited. Moreover, it is effective to apply the counterfeiting prevention label 1 of the present invention capable of identifying genuineness to computers, parts of apparatus using computers, functional circuit boards, storage devices and parts of precision machines and automobiles. The counterfeiting prevention label 1 of the present invention may be attached to packages, containers, cases and bags for containing foregoing articles and goods as well as to the foregoing articles and goods.

EXAMPLES

Example 1

A volume hologram transfer sheet 10 having a volume hologram 2 to be attached to a surface of a counterfeiting prevention label was fabricated. The volume hologram transfer sheet 10 was a laminated structure of construction expressed by (support sheet 9)/(release protective layer 21)/(volume hologram layer 22)/(heat-sensitive adhesive layer 23), in which the slash mark "/" indicates bonding adjacent layers. The release protective layer 21, the volume hologram layer 22 and the heat-sensitive adhesive layer 23 were formed separately on separate sheets, respectively. The unit of the ratio of the amount of a component to a material is "parts by mass" unless otherwise specified.

A 50-μm thick PET film (Lumilar T60® Toray Ind. Inc.) was used as a first film. A coating composition, namely, a volume hologram recording material, of the following formulation was applied to one surface of the first film to form a 10 μm thick volume hologram recording layer. A 38 μm thick release PET film provided with a release layer (SP-PET®, Tosero) was attached to the to the volume hologram recording layer with the release layer in contact with the volume hologram recording layer.

Coating Composition for Volume Hologram Recording Layer Polymethyl methacrylate resin (molecular Weight: 20,000): 500 parts
3,9-Diethyl-3'-carboxymethyl-2,2'-thiacarbo-Cyanine iodine salt: 5 parts
Diphenyl iodonium hexafluoroantimonate: 60 parts 2,2'-Bis[4-(acryloxydiethoxy)phenyl]
Propane: 800 parts
Pentaerythritol polyglycidyl ether: 800 parts A 50-μm thick PET film (Lumilar T60® Toray Ind. Inc.) was used as a second film. A coating composition, namely, a release protective layer forming composition was applied to one surface of the second film and dried to form a release protective layer of 1 μm in dry thickness.

Release Protective Layer Forming Composition Polymethyl methacrylate resin (molecular Weight: 35,000): 97 parts
Polyethylene wax (molecular weight: 10,000, Mean particle size: 5 μm): 3 parts
Methyl ethyl ketone: 200 parts
Toluene: 200 parts A 50-μm thick release PET film provided with a release layer (SP-PET®, Tosero) was used as a third film. A heat-sensitive adhesive layer forming composition of the following formulation was applied to the release layer of the third film and dried to form a heat-sensitive adhesive layer of 4 μm in dry thickness.

Heat-sensitive Adhesive Layer Forming Composition Ethylene-vinyl acetate copolymer (solvent solution of AD1790-15®, solid content: 15%, Toyo-Morton)

A Lippmann hologram was recorded on the laminated structure of construction expressed by (first film)/(volume hologram recording layer)/(release PET film) with laser beams of 532 nm in wavelength. Then, the release PET film was removed, and the laminated structure of construction expressed by (second film)/(release protective layer) was attached to the exposed volume hologram recording layer with the release protective layer in contact with the volume hologram recording layer. A laminated structure thus formed was passed between a pair of hot rollers heated at 80° C. to complete a laminated structure of construction expressed by (first film)/(volume hologram recording layer)/(release protective layer)/(second film). The laminated structure thus formed was heated in an atmosphere of 130° C. for 5 min and the whole laminated structure was irradiated with UV radiation emitted by a high-pressure mercury lamp at an irradiance of 2,500 mJ/cm² to fix the volume hologram recording layer on which the Lippmann hologram was recorded.

The first film was removed from the laminated structure after fixing the volume hologram recording layer. The laminated structure of construction expressed by (third film)/(heat-sensitive adhesive layer) was attached to the exposed volume hologram recording layer with the heat-sensitive adhesive layer in contact with the volume hologram recording layer to complete a volume hologram transfer sheet, namely, a laminated structure of construction expressed by (third film)/(heat-sensitive adhesive layer)/(volume hologram recording layer)/(release protective layer)/(second film). The reconstructed wave of the volume hologram of the volume hologram transfer sheet was 502 nm.

The volume hologram transfer sheet was slit longitudinally into 10 mm wide volume hologram ribbons (laminated transfer structure A1).

A coated paper sheet as a label base (Swingmat®, Mitsubishi Seishi, basis weight: 64.0 g/m²) was prepared. A pattern of a frame of 41 mm×56 mm and lines demarcating printing spaces as shown in FIG. 1 was printed repeatedly. A 30 μm thick self-adhesive layer of a self-adhesive layer forming composition of the following formulation was formed on a silicone-treated release paper sheet, and the coated paper sheet was attached to the self-adhesive layer with its back surface in contact with the self-adhesive layer. The volume hologram transfer ribbon was applied to the coated paper sheet at a position at 5 mm inside from the left sides of the printed frames, and the volume hologram transfer ribbon and the coated paper sheet was passed between a pair of hot rollers heated at 120° C. for the continuous transfer of the volume holograms. Then, the second film was removed. Subsequently, the component layers of the laminated structure excluding the release paper sheet were cut by half blanking in a rectangular shape of 45 mm×60 mm along lines at 2 mm outside from the sides of the frames with a cutting die provided with cutting blades. Then, fragments of the paper sheets and self-adhesive layer between the label bases were removed to complete counterfeiting prevention labels as shown in FIGS. 2(a) and 2(b).

Self-adhesive Layer Forming Composition
Acrylic adhesive ((Nissetsu PE-118®, Nippon Carbide): 70 parts
Crosslinker (Nissetsu CK-101®, Nippon Carbide): 2 parts
Methyl ethyl ketone: 14 parts
Toluene: 7 parts
Ethyl acetate: 7 parts.

The height of a step between a part to which the volume hologram was transferred and a part to which nothing was transferred in the thus fabricated counterfeiting prevention label was 15 μm equal to the sum of the respective thicknesses of 1 μm, 10 μm and 4 μm of the release protective layer, the volume hologram layer formed by recording the volume hologram on the recording material and the heat-sensitive adhesive layer of the volume hologram. A bar code and characters were printed on the counterfeiting prevention label by a bar code printer (TBLP-4000®, Token) using a hot-melt transfer ribbon (R-300®, Nippon Insatsu). Although a blank of about 0.3 mm in width corresponding to the step was formed in the printed bar code and the printed characters, the characters could be read. The counterfeiting prevention label printed with the bar code and the characters was photographed to duplicate the volume hologram. Since both the volume hologram and the printed characters were photographed the original volume hologram could not be duplicated.

Example 2

The volume hologram transfer sheet 10 is a laminated transfer sheet of construction expressed by (support sheet 9)/(release protective layer 21)/(volume hologram layer 22)/(heat-sensitive (or pressure-sensitive) adhesive layer 23).

The base to which the laminated transfer structure is transferred is a laminated base structure B of construction expressed by (processed surface)/(base sheet 31)/(self-adhesive layer 32)/(release sheet (release paper sheet) 5).

Properties of the processed surface of the laminated base structure B are selectively determined taking into consideration a printing method to be employed and a print ribbon to be used. Possible printing methods are a hot-melt printing method, a sublimation transfer printing method and ink-jet printing method. When the characters are printed by a hot-melt transfer printing method, resins, semiresins and waxes are possible. Generally, the surface of the laminated base structure B is coated with a coating to improve the printability of the surface and to improve the environmental resistances, such as scratch resistance, light-fastness, heat resistance, moisture resistance and chemical resistance, of the printed characters.

The laminated base structure B to which the laminated transfer structure is transferred is a paper sheet or a plastic sheet. When the laminated transfer structure is to be attached to the printed surface of the laminated base structure B, the adhesive layer of the laminated transfer structure is formed of an adhesive capable of properly adhering to the surface of the laminated base structure B.

Fabrication of Laminated Transfer Structure A2

A Lippmann hologram was recorded with laser light of 532 nm in wavelength on a hologram recording film (Omnidex 801®, du Pont) of construction expressed by (50 μm thick PET film 1)/(15 μm thick volume hologram recording material layer)/(25 μm thick PET film 2). Then, the PET film 2 was removed, a laminated structure of construction expressed by (second film)/(release protective layer) was supposed on the hologram recording film with the release protective layer in contact with the exposed volume hologram recording material layer to form a superposed structure. The superposed structure was passed between a pair of hot rollers heated at 80° C. to complete a laminated structure of construction expressed by (first film)/(volume hologram recording material layer)/(release protective layer/second film). Then, the laminated structure was heated at 130° C. for 15 min in a hot atmosphere to fix the volume hologram recording material layer after recording the Lippmann hologram. Then, the PET film 1 was removed from the laminated structure, and an acrylic adhesive film (Noncarrier PL thin®, Lintec) of construction expressed by (50 μm thick release PET film)/(10 μm thick pressure-sensitive adhesive layer)/(38 μm thick release PET film) was attached to the exposed surface after removing the release PET film 2 to complete a laminated transfer structure A2 of construction expressed by (PET)/(release protective layer)/(volume hologram layer)/(pressure-sensitive adhesive layer)/(release PET film 1).

The respective thicknesses of the release protective layer, the volume hologram layer and the pressure-sensitive adhesive layer were 1 μm, 15 μm and 10 μm and the sum of those thicknesses was 26 μm.

Lamination of Laminated Transfer Structure A1 and LR1110

A pattern of a frame of 41 mm×56 mm and lines demarcating printing spaces as shown in FIG. 1 was printed repeatedly on the laminated base structure B by a printing method using a hot-melt transfer ribbon, namely, a self-adhesive printing paper sheet (LR1110®, Lintec of construction expressed by (75 g/m² paper sheet)/(25 μm thick general high self-adhesive layer)/(blue glassine release paper sheet) available from Lintex.

Then, the volume hologram transfer ribbon, namely, the laminated transfer structure A1 in Example 1, was applied to the laminated base structure B at a position at 5 mm inside from the left sides of the printed frames from the volume hologram transfer ribbon and the volume hologram transfer ribbon and the laminated base structure B were passed between a pair of hot rollers heated at 120° C. for the continuous transfer of the volume holograms. Then, the second film was removed to transfer the volume holograms. Subsequently, the component layers of the laminated structure excluding the release paper sheet were cut (half cut) in a rectangular shape of 45 mm×60 mm along lines at 2 mm outside from the sides of the frames with a cutting die provided with cutting blades. Then, fragments of the paper sheets and self-adhesive layer between the label bases were removed to complete counterfeiting prevention labels.

Bar codes and characters were printed in a satisfactory print quality on the counterfeiting prevention labels by a bar code printer and labeler (LVIS100®, Zebra Technologies) using a hot-melt transfer ribbon (SI-2101®, Lintec)

[Lamination of Laminated Transfer Structure A1 and FR1225-50

A counterfeiting prevention label as shown in FIG. 2 was fabricated by a method similar to the foregoing method, except that another hot-melt transfer ribbon (FR1225-50® of construction expressed by (50 μm thick transparent PET film)/(25 μm thick general high self-adhesive layer)/(PE-coated blue glassine release paper sheet) available from Lintec was used instead of LR1110®.

Bar codes and characters were printed in a satisfactory print quality on the counterfeiting prevention labels by a bar code printer (105SL®, Zebra Technologies) using a hot-melt transfer ribbon (R-300®, Dai-Nippon Printing).

Lamination of Laminated Transfer Structure A2 and LR1110

A pattern of a frame of 41 mm×56 mm and lines demarcating printing spaces as shown in FIG. 1 was printed repeatedly on the laminated base structure B by a printing method using a hot-melt transfer ribbon, namely, a self-adhesive printing paper sheet (LR1110®, Lintec of construction expressed by (75 g/m² paper sheet)/(25 μm thick general high self-adhesive layer)/(blue glassine release paper sheet) available from Lintex.

Then, the volume hologram transfer ribbon, namely, the laminated transfer structure A2, was applied to the laminated base structure B at a position at 5 mm inside from the left sides of the printed frames from the volume hologram transfer ribbon and the volume hologram transfer ribbon and the laminated base structure B were passed between a pair of hot rollers heated at 120° C. for the continuous heat transfer of the volume holograms. Then, the PET film was removed to transfer the volume holograms. Subsequently, the component layers of the laminated structure excluding the release paper sheet were cut (half cut) in a rectangular shape of 45 mm×60 mm along lines at 2 mm outside from the sides of the frames with a cutting die provided with cutting blades. Then, fragments of the paper sheets and self-adhesive layer between the label were removed to complete counterfeiting prevention labels as shown in FIGS. 2(a) and 2(b).

Bar codes and characters were printed on the counterfeiting prevention labels by a bar code printer (105SL®, Zebra Technologies) using a hot-melt transfer ribbon (R-300®, Dai-Nippon Printing). The bar codes and the characters were printed in an unsatisfactory print quality because the height of the step was as great as 26 μm. A depression of a depth of 10 μm was formed in the label base and the volume hologram 2 was transferred to the depression to form a modified counterfeiting prevention labels. Bar codes and characters were printed in a satisfactory print quality because the height of the step was as low as about 15 μm.

According to the present invention, the volume hologram ribbon is extended between the opposite ends of the base sheet such that the opposite ends of the volume hologram ribbon are flush with the opposite ends of the label base sheet, respectively. Therefore, severability of the volume hologram layer does not need to be taken into consideration when the volume hologram layer is transferred to the label base sheet, and the volume hologram layer having a clear outline can be transferred to the label base sheet. Thus the volume hologram is able to exhibit a high resistance to forgery and counterfeiting.

The present invention is able to provide a counterfeiting prevention label of a general, quadrilateral shape.

According to the present invention, the volume hologram layer is bonded to the label base sheet by the heat-sensitive adhesive layer. Therefore, the counterfeiting prevention label of the present invention is suitable for lamination that heats an adhesive layer by heating.

According to the present invention, the volume hologram is covered with the protective layer. Therefore, the surface of the volume hologram layer of the counterfeiting prevention label of the present invention has improved physical and chemical durability.

According to the present invention, the volume hologram layer is placed in the depression formed in the surface of the base sheet. Consequently, the step in the surface of the counterfeiting prevention label of the present invention rarely spoils the print quality of printed characters or makes the printed characters difficult to read.

According to the present invention, the self-adhesive layer and the release seat are laminated to the surface of the base sheet opposite the surface of the same on which the volume hologram layer is formed. Since the self-adhesive layer is protected before the counterfeiting prevention label is attached to an article, accidental adhesion of the self-adhesive layer to an undesired article can be prevented, and the counterfeiting prevention label can be easily attached to a desired article simply by pressing the counterfeiting prevention label against the article.

According to the present invention, since the component layers of the laminated structure excluding the release sheet are cut by half blanking, the counterfeiting prevention label formed in a predetermined shape can be easily peeled off the release sheet.

According to the present invention, since characters are printed across the boundary between the volume hologram layer and the surface of the base sheet, and not coated with the volume hologram layer, the printed information can be easily identified as genuine. Even if an attempt is made to duplicate the volume hologram with an illegal intention of using the duplicate volume hologram, it is difficult to duplicate the counterfeiting prevention label of the present invention.

According to the present invention, the volume hologram transfer ribbon is blanked after transfer and hence the width of the volume hologram layer is dependent on the shape of the volume hologram transfer ribbon and the length of the same is determined by blanking after transfer. Therefore, the shape of the volume hologram layer can be clearly determined. Since no base material is necessary for forming the volume hologram layer, the step formed by the volume hologram layer is low. Since the deterioration of the print quality of the printed characters can be limited to a small extent, the counterfeiting prevention label manufacturing method is able to make the volume hologram fully exhibit its characteristics.

The counterfeiting prevention label manufacturing method of the present invention is able to form a low step between the volume hologram layer and the surface of the base sheet by forming the depression in the base sheet before transferring the volume hologram layer to the base sheet.

The counterfeiting prevention label manufacturing method of the present invention is able to limit the deterioration of print quality to a small extent by the step.

The invention claimed is:

1. A counterfeiting prevention label comprising:
a base sheet; and
a volume hologram covering a part of a front surface of the base sheet, formed by a transfer process, wherein:
the volume hologram has the shape of a ribbon and extends between a first end of the base sheet and a second end of the base sheet opposite the first end;
an end surface of one end of the volume hologram is flush with an end surface of the first end of the base sheet;
an end surface of an other end of the volume hologram is flush with an end surface of the second end of the base sheet;
a self-adhesive layer is formed on a back surface of the base sheet, and the self-adhesive layer is covered with a release sheet, and the release sheet is larger than the base sheet;
the volume hologram does not cover an entire surface of the base sheet and the front surface of the volume hologram is exposed to an outside front surface of the base sheet; and
printing is made on the front surface of the volume hologram and continues onto the front surface of the base sheet.

2. The counterfeiting prevention label according to claim 1, wherein the base sheet has a quadrilateral shape, and
the volume hologram extends between a first side of the base sheet and a second side of the base sheet opposite the first side.

3. The counterfeiting prevention label according to claim 1, wherein the volume hologram is bonded to the front surface of the base sheet with a heat-sensitive adhesive layer or a pressure-sensitive adhesive layer.

4. The counterfeiting prevention label according to claim 1, wherein the surface of the volume hologram not facing the base sheet is coated with a protective layer.

5. The counterfeiting prevention label according to claim 1, wherein the part, coated with the volume hologram, of the front surface of the base sheet is depressed relative to a part, not coated with the volume hologram, of the front surface of the base sheet to form a depression.

6. The counterfeiting prevention label according to claim 1, wherein the release sheet is larger than the base sheet,
the base sheet, the volume hologram and the self-adhesive layer form a laminated structure,
a plurality of laminated structures are arranged on the release sheet, and
the plurality of laminated structures have substantially a same desired shape in a plane and are spaced apart from each other.

7. The counterfeiting prevention label according to claim 1, wherein characters are printed on the volume hologram and/or a part, not coated with the volume hologram, of the front surface of the base sheet.

8. A counterfeiting prevention label manufacturing method comprises the steps of:
forming a transfer ribbon by releasably laminating a volume hologram to a support sheet;
transferring the volume hologram to a front surface of a base sheet by a transfer process by superposing the transfer ribbon on the base sheet with the volume hologram facing the base sheet;
blanking out the base sheet and the volume hologram in a predetermined shape; and forming a self-adhesive layer on a back surface of the base sheet, and the adhesive layer is covered with a release sheet, and the release sheet is larger than the base, wherein:

the volume hologram is transferred to the front surface of the base sheet such that the volume hologram does not cover the entire surface of the base sheet and the front surface of the volume hologram is exposed to an outside of the counterfeiting front surface of the base sheet; and printing is made from the front surface of the volume hologram to the front surface of the base sheet.

9. The counterfeiting prevention label manufacturing method according to claim 8, wherein a depression is formed in the surface of the base sheet before transferring the volume hologram to the surface of the base sheet, and the volume hologram is transferred to the bottom surface of the depression.

10. The counterfeiting prevention label manufacturing method according to claim 8, wherein characters are printed on the volume hologram and/or a part, not coated with the volume hologram, of the front surface of the base sheet before blanking out the base sheet and the volume hologram in a desired shape.

* * * * *